United States Patent
Kishore et al.

(10) Patent No.: US 11,994,969 B2
(45) Date of Patent: May 28, 2024

(54) COLLECTOR CONFLICT RESOLUTION

(71) Applicant: Dell Products L.P., Round Rock, TX (US)

(72) Inventors: Saurabh Kishore, Round Rock, TX (US); Sudhir Shetty, Cedar Park, TX (US)

(73) Assignee: DELL PRODUCTS L.P., Round Rock, TX (US)

(*) Notice: Subject to any disclaimer, the term of this patent is extended or adjusted under 35 U.S.C. 154(b) by 0 days.

(21) Appl. No.: 17/812,529

(22) Filed: Jul. 14, 2022

(65) Prior Publication Data

US 2024/0020210 A1    Jan. 18, 2024

(51) Int. Cl.
*G06F 11/30*     (2006.01)
*G06F 18/22*     (2023.01)

(52) U.S. Cl.
CPC ...... *G06F 11/3006* (2013.01); *G06F 11/3075* (2013.01); *G06F 18/22* (2023.01)

(58) Field of Classification Search
CPC .... G06F 11/30; G06F 11/323; G06F 11/3006; G06F 11/3034; G06F 11/3075; G06F 11/3466; G06F 11/3476; G06F 9/46; G06F 9/47; G06F 9/48; G06F 9/49; G06F 9/50; G06F 18/22; G06N 20/20; G06N 5/025; G06K 9/6264
USPC ........................................................ 709/224
See application file for complete search history.

(56) References Cited

U.S. PATENT DOCUMENTS

| | | | |
|---|---|---|---|
| 7,606,895 B1* | 10/2009 | Dini | H04L 41/0893 709/224 |
| 8,521,700 B2* | 8/2013 | Chambliss | G06F 11/3495 707/688 |
| 11,416,364 B2* | 8/2022 | Grigoryan | G06F 11/3006 |
| 2013/0124669 A1* | 5/2013 | Anderson | G06F 11/301 709/224 |
| 2016/0359679 A1* | 12/2016 | Parandehgheibi | H04L 67/01 |
| 2016/0359912 A1* | 12/2016 | Gupta | H04L 61/5007 |
| 2017/0010930 A1* | 1/2017 | Dutta | G06F 11/0772 |
| 2018/0101907 A1* | 4/2018 | Yamashita | G06F 16/23 |
| 2018/0165142 A1* | 6/2018 | Harutyunyan | G06F 11/0751 |
| 2018/0253337 A1* | 9/2018 | Barsness | G06F 9/5061 |
| 2018/0351956 A1* | 12/2018 | Verma | H04W 12/08 |
| 2019/0342145 A1* | 11/2019 | Chen | H04L 41/12 |
| 2020/0042370 A1* | 2/2020 | Kao | G06F 11/008 |

(Continued)

*Primary Examiner* — James N Fiorillo
(74) *Attorney, Agent, or Firm* — Amin, Turocy & Watson, LLP

(57) ABSTRACT

A system can, in response to receiving first monitoring data for a first computing system from a first collector, associate the first computing system with a first cluster of a group of clusters that corresponds to the first collector. The system can, in response to receiving second monitoring data for the first computing system from a second collector, and in response to determining that a first similarity value between the first computing system and the first collector is less than a second similarity value between the first computing system and the second collector, change an association of the first computing system from the first cluster to a second cluster of the group of clusters that corresponds to the second collector. The system can, in response to changing the association, store third monitoring data for the first computing system that is received from the second collector.

20 Claims, 11 Drawing Sheets

(56) References Cited

U.S. PATENT DOCUMENTS

| | | | |
|---|---|---|---|
| 2020/0043262 A1* | 2/2020 | Schlacks, IV | G06Q 20/203 |
| 2020/0272552 A1* | 8/2020 | Markiewicz | G06N 20/00 |
| 2021/0097448 A1* | 4/2021 | San Miguel Gonzalez | G06N 5/025 |
| 2021/0149744 A1* | 5/2021 | Sharma | G06F 11/3006 |
| 2021/0303431 A1* | 9/2021 | Grigoryan | G06F 11/3476 |
| 2021/0303438 A1* | 9/2021 | Nag | G06F 11/3006 |
| 2021/0327188 A1* | 10/2021 | Schlacks, IV | G06Q 20/203 |
| 2021/0352115 A1* | 11/2021 | Hansen | H04L 43/0811 |
| 2021/0389894 A1* | 12/2021 | Zhou | G06F 3/067 |
| 2022/0137985 A1* | 5/2022 | Murugan | G06F 8/65 713/100 |
| 2022/0206832 A1* | 6/2022 | Berry | G06F 9/45558 |
| 2022/0337611 A1* | 10/2022 | Brazao | H04L 41/0806 |
| 2023/0055263 A1* | 2/2023 | Zhong | G06N 3/0455 |
| 2023/0089783 A1* | 3/2023 | Patel | G06F 11/1433 707/703 |

* cited by examiner

800

(802)

↓

IN RESPONSE TO RECEIVING FIRST MONITORING DATA FOR A FIRST COMPUTING SYSTEM FROM A FIRST COLLECTOR, ASSOCIATING THE FIRST COMPUTING SYSTEM WITH A FIRST CLUSTER OF A GROUP OF CLUSTERS THAT CORRESPONDS TO THE FIRST COLLECTOR 804

↓

IN RESPONSE TO RECEIVING SECOND MONITORING DATA FOR THE FIRST COMPUTING SYSTEM FROM A SECOND COLLECTOR, AND IN RESPONSE TO DETERMINING THAT A FIRST SIMILARITY VALUE BETWEEN THE FIRST COMPUTING SYSTEM AND THE FIRST COLLECTOR IS LESS THAN A SECOND SIMILARITY VALUE BETWEEN THE FIRST COMPUTING SYSTEM AND THE SECOND COLLECTOR, CHANGING AN ASSOCIATION OF THE FIRST COMPUTING SYSTEM FROM THE FIRST CLUSTER TO A SECOND CLUSTER OF THE GROUP OF CLUSTERS THAT CORRESPONDS TO THE SECOND COLLECTOR 806

↓

IN RESPONSE TO CHANGING THE ASSOCIATION OF THE FIRST COMPUTING SYSTEM FROM THE FIRST CLUSTER TO THE SECOND CLUSTER, STORING THIRD MONITORING DATA FOR THE FIRST COMPUTING SYSTEM THAT IS RECEIVED FROM THE SECOND COLLECTOR AND DISREGARDING FOURTH MONITORING DATA FOR THE FIRST COMPUTING SYSTEM THAT IS RECEIVED FROM THE FIRST COLLECTOR 808

ASSOCIATING A FIRST DEVICE WITH A FIRST CLUSTER OF A GROUP OF CLUSTERS THAT CORRESPONDS TO A FIRST COLLECTING DEVICE THAT PROVIDES MONITORING DATA ABOUT THE FIRST DEVICE 904

IN RESPONSE TO RECEIVING SECOND MONITORING DATA FOR THE FIRST DEVICE FROM A SECOND COLLECTING DEVICE, AND IN RESPONSE TO DETERMINING THAT A FIRST SIMILARITY VALUE BETWEEN THE FIRST DEVICE AND THE FIRST COLLECTING DEVICE IS LESS THAN A SECOND SIMILARITY VALUE BETWEEN THE FIRST DEVICE AND THE SECOND COLLECTING DEVICE, CHANGING AN ASSOCIATION OF THE FIRST DEVICE FROM THE FIRST CLUSTER TO A SECOND CLUSTER OF THE GROUP OF CLUSTERS THAT CORRESPONDS TO THE SECOND COLLECTING DEVICE 906

IN RESPONSE TO CHANGING THE ASSOCIATION OF THE FIRST DEVICE FROM THE FIRST CLUSTER TO THE SECOND CLUSTER, STORING THIRD MONITORING DATA FOR THE FIRST DEVICE THAT IS RECEIVED FROM THE SECOND COLLECTING DEVICE AND DISREGARDING FOURTH MONITORING DATA FOR THE FIRST DEVICE THAT IS RECEIVED FROM THE FIRST COLLECTING DEVICE 908

ASSOCIATING A FIRST COMPUTING DEVICE WITH A FIRST CLUSTER OF A GROUP OF CLUSTERS THAT CORRESPONDS TO A FIRST COLLECTING DEVICE THAT PROVIDES MONITORING DATA ABOUT THE FIRST COMPUTING DEVICE 1004

↓

IN RESPONSE TO RECEIVING SECOND MONITORING DATA FOR THE FIRST COMPUTING DEVICE FROM A SECOND COLLECTING DEVICE, AND IN RESPONSE TO DETERMINING THAT A FIRST SIMILARITY VALUE BETWEEN THE FIRST COMPUTING DEVICE AND THE FIRST COLLECTING DEVICE IS LESS THAN A SECOND SIMILARITY VALUE BETWEEN THE FIRST COMPUTING DEVICE AND THE SECOND COLLECTING DEVICE, CHANGING AN ASSOCIATION OF THE FIRST COMPUTING DEVICE FROM THE FIRST CLUSTER TO A SECOND CLUSTER OF THE GROUP OF CLUSTERS THAT CORRESPONDS TO THE SECOND COLLECTING DEVICE 1006

↓

IN RESPONSE TO CHANGING THE ASSOCIATION OF THE FIRST COMPUTING DEVICE FROM THE FIRST CLUSTER TO THE SECOND CLUSTER, STORING THIRD MONITORING DATA FOR THE FIRST COMPUTING DEVICE THAT IS RECEIVED FROM THE SECOND COLLECTING DEVICE 1008

↓

(1010)

FIG. 10

COLLECTOR CONFLICT RESOLUTION

BACKGROUND

Monitoring data for multiple computers can be collected and uploaded to a central server for evaluation.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can, in response to receiving first monitoring data for a first computing system from a first collector, associate the first computing system with a first cluster of a group of clusters that corresponds to the first collector. The system can, in response to receiving second monitoring data for the first computing system from a second collector, and in response to determining that a first similarity value between the first computing system and the first collector is less than a second similarity value between the first computing system and the second collector, change an association of the first computing system from the first cluster to a second cluster of the group of clusters that corresponds to the second collector. The system can, in response to changing the association of the first computing system from the first cluster to the second cluster, store third monitoring data for the first computing system that is received from the second collector and disregard fourth monitoring data for the first computing system that is received from the first collector.

An example method can comprise associating, by a system comprising a processor, a first device with a first cluster of a group of clusters that corresponds to a first collecting device that provides monitoring data about the first device. The method can further comprise, in response to receiving second monitoring data for the first device from a second collecting device, and in response to determining that a first similarity value between the first device and the first collecting device is less than a second similarity value between the first device and the second collecting device, changing, by the system, an association of the first device from the first cluster to a second cluster of the group of clusters that corresponds to the second collecting device. The method can further comprise, in response to changing the association of the first device from the first cluster to the second cluster, storing, by the system, third monitoring data for the first device that is received from the second collecting device and disregarding fourth monitoring data for the first device that is received from the first collecting device.

An example non-transitory computer-readable medium can comprise instructions that, in response to execution, cause a system comprising a processor to perform operations. These operations can comprise associating a first computing device with a first cluster of a group of clusters that corresponds to a first collecting device that provides monitoring data about the first computing device. These operations can further comprise in response to receiving second monitoring data for the first computing device from a second collecting device, and in response to determining that a first similarity value between the first computing device and the first collecting device is less than a second similarity value between the first computing device and the second collecting device, changing an association of the first computing device from the first cluster to a second cluster of the group of clusters that corresponds to the second collecting device. These operations can further comprise, in response to changing the association of the first computing device from the first cluster to the second cluster, storing third monitoring data for the first computing device that is received from the second collecting device.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 8 illustrates another example process flow that can facilitate collector conflict resolution, in accordance with an embodiment of this disclosure;

FIG. 9 illustrates another example process flow that can facilitate collector conflict resolution, in accordance with an embodiment of this disclosure;

FIG. 10 illustrates another example process flow that can facilitate collector conflict resolution, in accordance with an embodiment of this disclosure;

DETAILED DESCRIPTION

Overview

Figure 1:
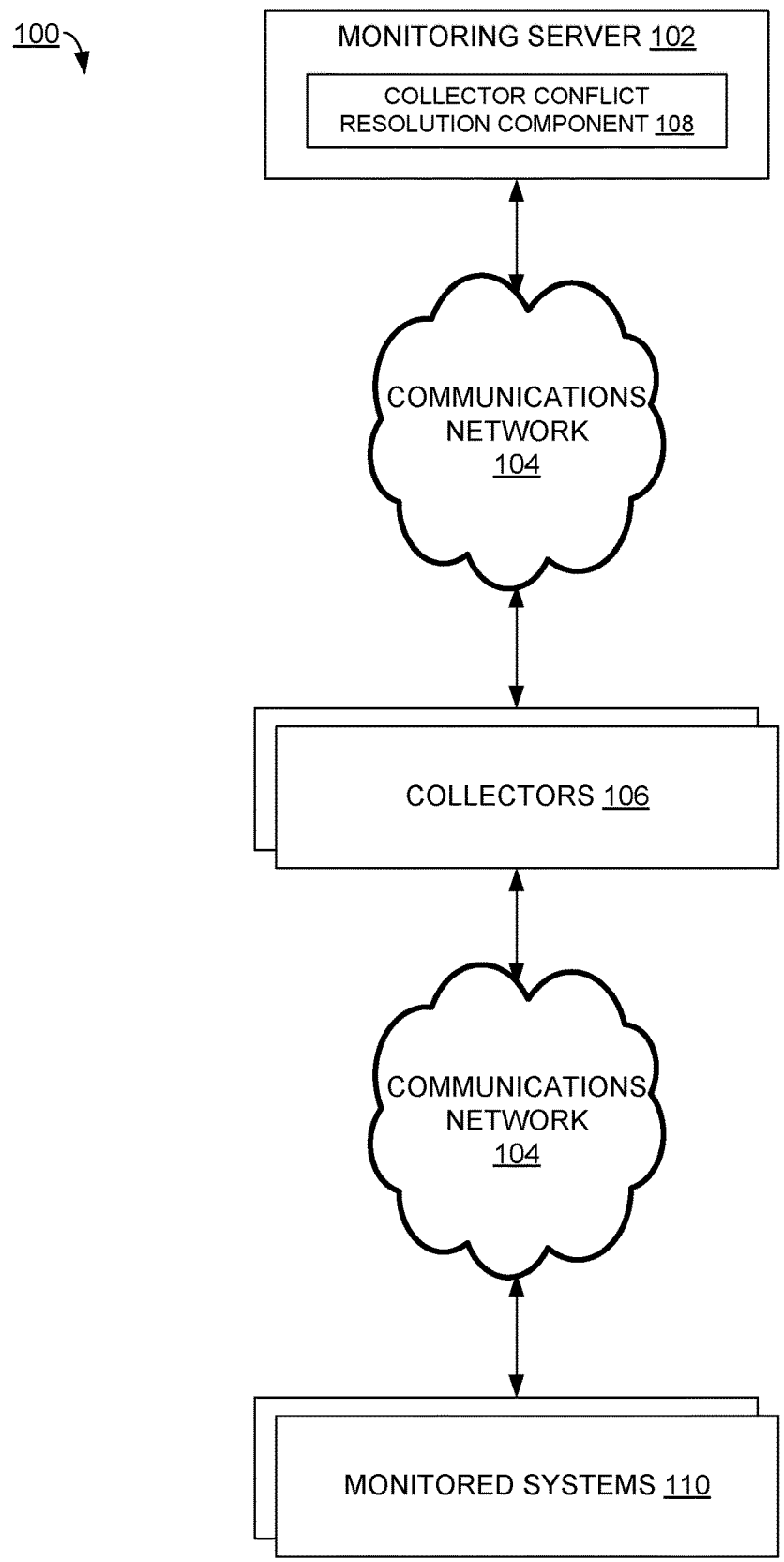
FIG. 1 illustrates an example system architecture that can facilitate collector conflict resolution, in accordance with an embodiment of this disclosure.

Server configuration/monitoring data for servers can be collected by a collector, or aggregator, and then uploaded to a cloud platform for monitoring. On a cloud platform, it can be important to perform a correct association of the collector with systems. This can be important from both a security and customer satisfaction perspective.

In some examples, data from a system can be collected by multiple collectors and uploaded to a cloud platform for monitoring. Prior approaches to these scenarios can have various problems. There can be a problem of determining which collector to associate with the system in a case where information for a system is coming via various collectors. There can be a problem of how to perform an initial assignment of a collector in an automated, intelligent, and correct way with high confidence. That is, there can be a problem with ensuring that a correct collector gets system ownership.

There can be a problem of determining when collector ownership flips securely for a system (e.g., determining when the system migrates from one collector to another). There can be a problem of how to avoid frequent flips that can cause a system to appear and vanish frequently (where an owner collector can change if the owner flips too often). There can be a problem of how to prevent denial of service (DOS) attacks for some systems. There can be a problem of how to dynamically update attributes that define a collector for decision-making.

The present techniques can overcome these problems with prior approaches by implementing an intelligent and reliable mechanism. That is, an intelligent clustering-based mechanism can be implemented to resolve payload assignments.

In some examples where a user provides feedback, user feedback can be utilized into resolution actions. This user feedback can override automated decisions. For example, a user can freeze a collector; a user can freeze a system; and/or a user can mark a system as having an ownership change. This approach can lead to secure assignments and prevent denial of service for a use since the association can be with the correct collector.

The present techniques can be implemented to collect clustering data, without any additional knowledge from the source, and apply the clustering data to conflict resolution in this domain. The present techniques can be implemented to establish rules for cluster assignments. The present techniques can be implemented to utilize user feedback to assign weights on neighboring systems in a cluster.

The present techniques can be implemented to go beyond making recommendations, to automatic application, and informing the user of the changes. The present techniques can be implemented for categorization and determination of a confidence score. Additionally, there can be a veto mechanism that can be used to override even a high score.

The present techniques can be implemented to provide a backup classification mechanism. This can be an indirect result of a combination of automatic resolutions and customer-enforced rules. The present techniques can be implemented to assess atypical behavior anomalies, and highlight them to customers for inventory changes.

Some prior approaches implement clustering and classification in machine learning. However, these techniques have not been applied to the present domain, nor have the parameters and user handling as described herein. That is, prior approaches have not resolved conflicts for assignments of systems to correct owners.

An approach that implements virtual IDs can have problems. For example, let there be two collectors sending data for S1, then two systems can be storing data independently. A problem with this virtual ID approach can relate to having multiple instances of the same data; lacking resolution or escalations of customer system conflicts; and there could be a genuine customer switch where data is lost anyway where a new virtual ID is generated on switching.

Example Architecture

FIG. 1 illustrates an example system architecture 100 that can facilitate collector conflict resolution, in accordance with an embodiment of this disclosure.

System architecture 100 comprises monitoring server 102, communications network 104, collectors 106, and monitored systems 110. In turn, monitoring server 102 comprises collector conflict resolution component 108.

Figure 11:
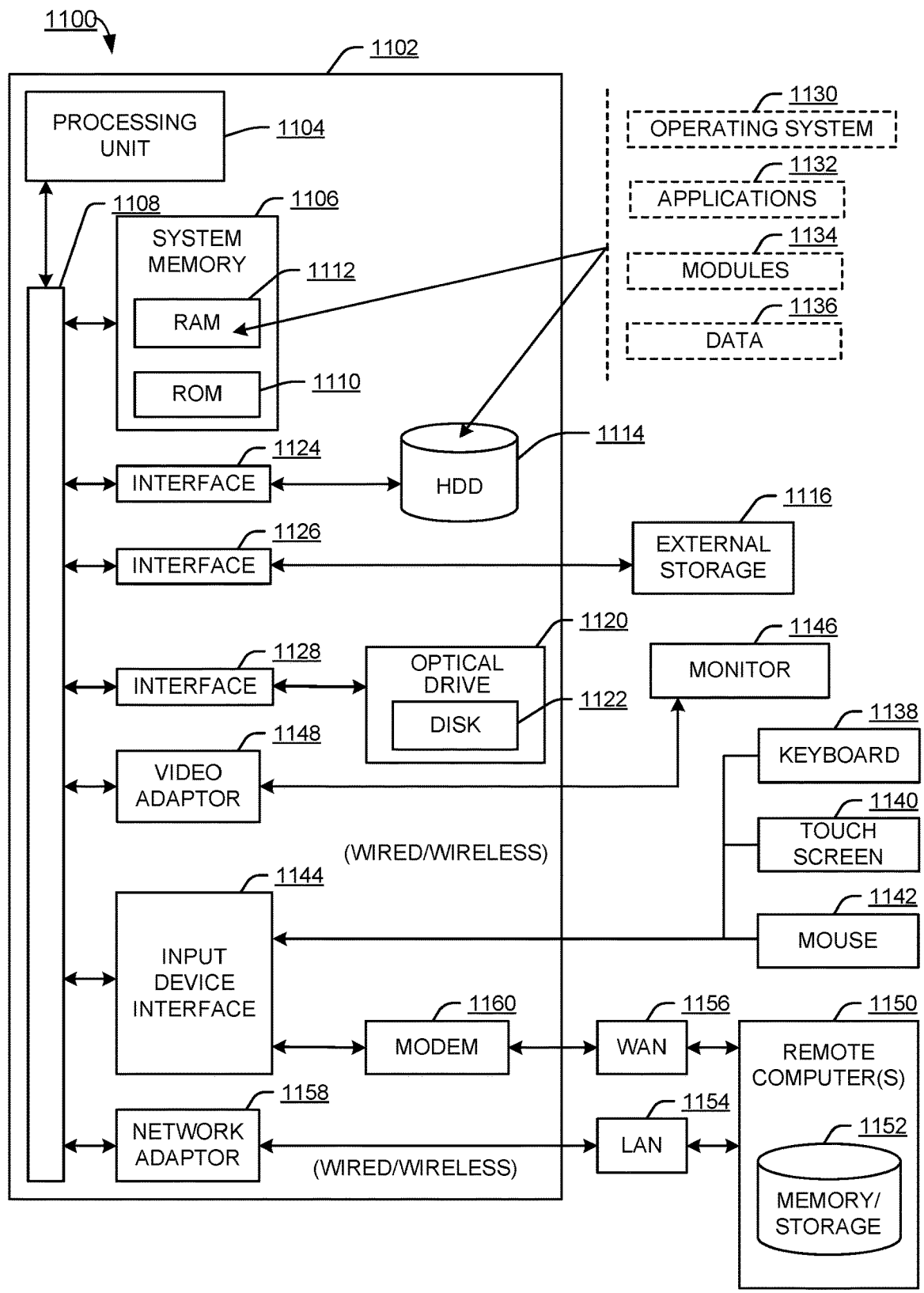
FIG. 11 illustrates an example block diagram of a computer operable to execute an embodiment of this disclosure.

Each of monitoring server 102, collectors 106, and/or monitored systems 110 can be implemented with part(s) of computing environment 1100 of FIG. 11. Communications network 104 can comprise a computer communications network, such as the Internet.

Each collector of collectors 106 can collect monitoring data from one or more monitored system of monitored systems 110. Collectors 106 can report their respective gathered monitoring data to monitoring server 102. In some examples, multiple collectors of collectors 106 can report monitoring data for the same monitored system of monitored systems 110 to monitoring server 102. In such examples, collector conflict resolution component 108 can determine which of these monitoring systems to collect information from for the monitored system, rather than accepting information from multiple collectors about the same monitored system.

In some examples, collector conflict resolution component 108 can implement part(s) of the process flows of FIGS. 8-10 to implement collector conflict resolution.

It can be appreciated that system architecture 100 is one example system architecture for collector conflict resolution, and that there can be other system architectures that facilitate collector conflict resolution.

Example Process Flow

Figure 2:
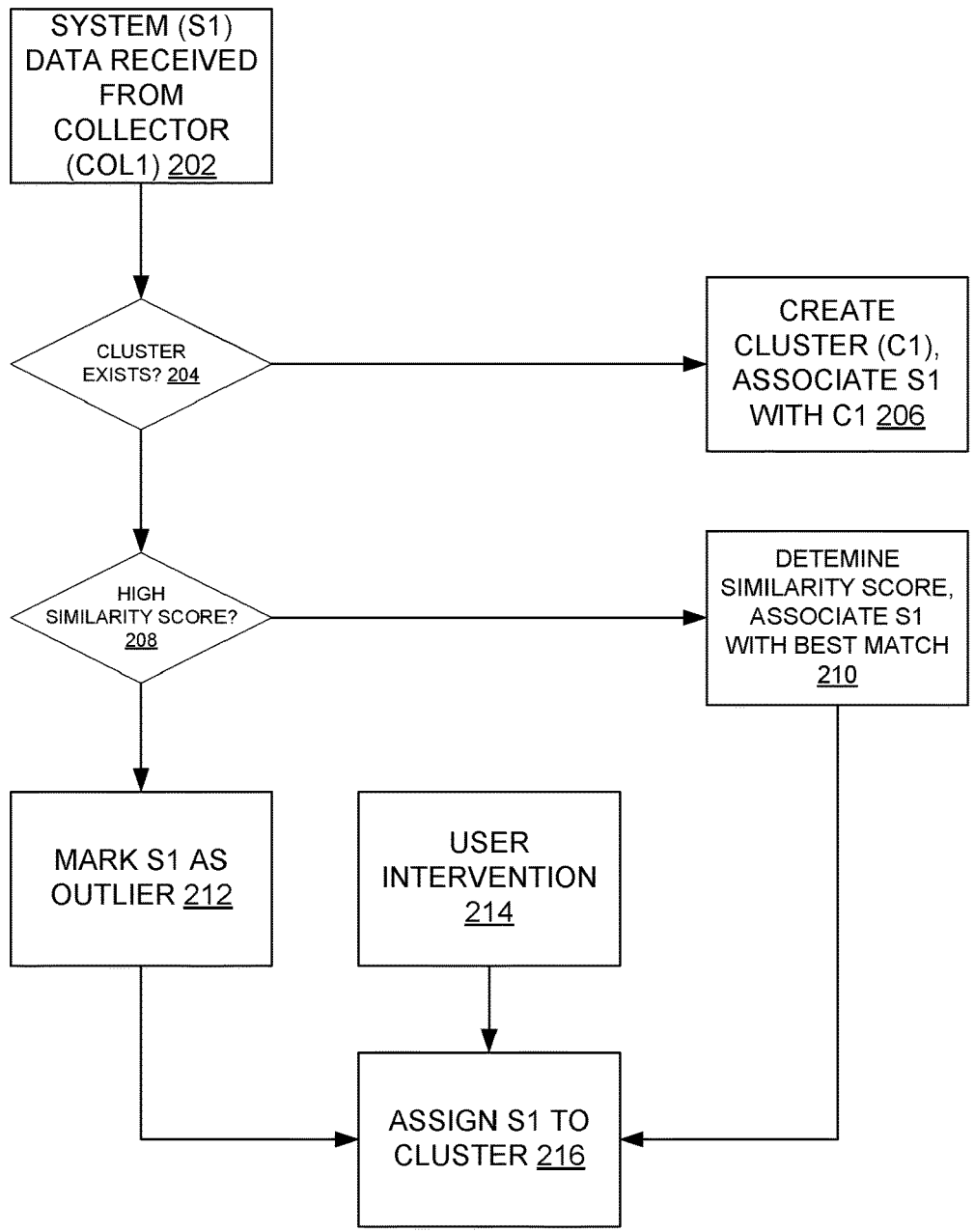
FIG. 2 illustrates an example process flow that can facilitate collector conflict resolution, in accordance with an embodiment of this disclosure.

FIG. 2 illustrates an example process flow 200 that can facilitate collector conflict resolution, in accordance with an embodiment of this disclosure. In some examples, part(s) of process flow 200 can be used to implement part(s) of collector conflict resolution component 108 of FIG. 1.

In some examples according to the present techniques, payloads can be received through multiple collectors. In some examples, the following example steps can be implemented. It can be appreciated that this is an example set of steps, and there can be other sets of steps that implement the present techniques.

Process flow 200 begins with system (S1) data received from collector (COL1) 202. This can comprise monitoring server 102 of FIG. 1 receiving data from a collector of collectors 106 about a monitored system of monitored systems 110.

After 202, process flow 200 moves to 204.

204 depicts determining whether a cluster exists. A cluster can be a way that collector conflict resolution component 108 classifies monitored systems to determine how similar two systems are. In a case where an instance of collector conflict resolution component 108 has recently started and has not previously received monitoring data, then it can be determined that collector conflict resolution component 108 does not currently have a cluster, and process flow 200 can move to 206. Where collector conflict resolution component 108 has already created a cluster, it can be determined that collector conflict resolution component 108 does currently have a cluster, and process flow 200 can move to 208.

In process flow 200, 206 is reached from 204 where it is determined that a cluster does not exist. 206 depicts creating a new cluster (C1) and associating S1 with C1. This can comprise collector conflict resolution component 108 of FIG. 1 creating a new cluster for classifying monitored systems, and can be performed in a similar manner as described with respect to system architecture 300 of FIG. 3. After 206, process flow 200 ends.

In process flow 200, 208 is reached from 204 where it is determined that a cluster exists. 208 depicts determining whether a match is found for S1 with a sufficient similarity score. This is a similarity score between S1 and a cluster that comprises other systems that can be similar, or dissimilar, to S1.

In some examples, a flip of associating a system with one collector to another is permitted only at certain times. A check to see if a flip should be made (if allowed at a certain time) can be performed each time data is received from a collector.

This similarity score can be a predetermined threshold value, such that, if the threshold is not met, S1 is deemed an outlier rather than assigned to a pre-existing cluster. Where it is determined that a match is found for S1 with a sufficient similarity score, process flow 200 moves to 210. Instead, where it is determined that a match is not found for S1 with a sufficient similarity score, process flow 200 moves to 212.

In process flow 200, 210 is reached from 208 where it is determined that a match is found for S1 with a sufficient similarity score. In 208, first, a similarity score can be determined for S1, and S1 can be associated with a best matching cluster based on the similarity score. This can be performed in a similar manner as depicted with respect to cluster graph 400 of FIG. 4.

In some cases, S1 can be flipped—or moved—from one cluster to another. In some examples, this can occur (a) where a similarity score between S1 and C1 is greater than a similarity score between S1 and another cluster (C2) to which S1 is currently assigned; or where S2 is no longer active. Clusters can be updated accordingly. After 210, process flow 200 moves to 216.

In process flow 200, 212 is reached from 208 where it is determined that a match is not found for S1 with a sufficient similarity score. 212 depicts marking S1 as an outlier. This can comprise a case where a system is deemed too different from pre-existing clusters to be assigned to any of those clusters. After 212, process flow 200 moves to 216.

In process flow 200, 214 depicts receiving user input data. This can comprise user intervention to override or otherwise affect the assignment of S1 to a particular cluster, such as by freezing a system or a cluster. After 214, process flow 200 moves to 216.

In process flow 200, 216 is reached from 210, 212, and 214. A cluster determination for S1 in 210 or 212 can be modified by user input data in 214, and in 216, a final assignment of S1 with a cluster in this iteration of process flow 200 can be performed. After 216, process flow 200 ends.

Example Architecture

Figure 3:
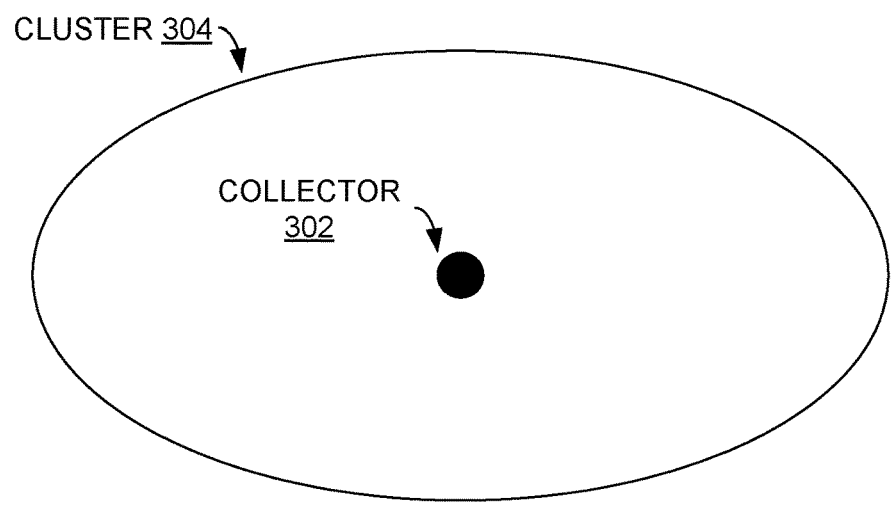
FIG. 3 illustrates an example system architecture for creating a cluster of devices that can facilitate collector conflict resolution, in accordance with an embodiment of this disclosure.

FIG. 3 illustrates an example system architecture 300 for creating a cluster of devices that can facilitate collector conflict resolution, in accordance with an embodiment of this disclosure. In system architecture 300, collector COL1 302 is assigned to a newly created cluster C1 304 because a cluster does not already exist. This can be similar as to described with respect to 206 in process flow 200 of FIG. 2.

Where there are no clusters of devices, a new cluster can be created for the new device. C1 304 can be associated with COL 302 (that is, in some examples, the first collector to send a payload wins).

In system architecture 300, an outer boundary of cluster C1 304 can indicate a similarity requirement between collector COL 1 302 and a system for that system to be associated with cluster C1 304.

Example Graph

Figure 4:
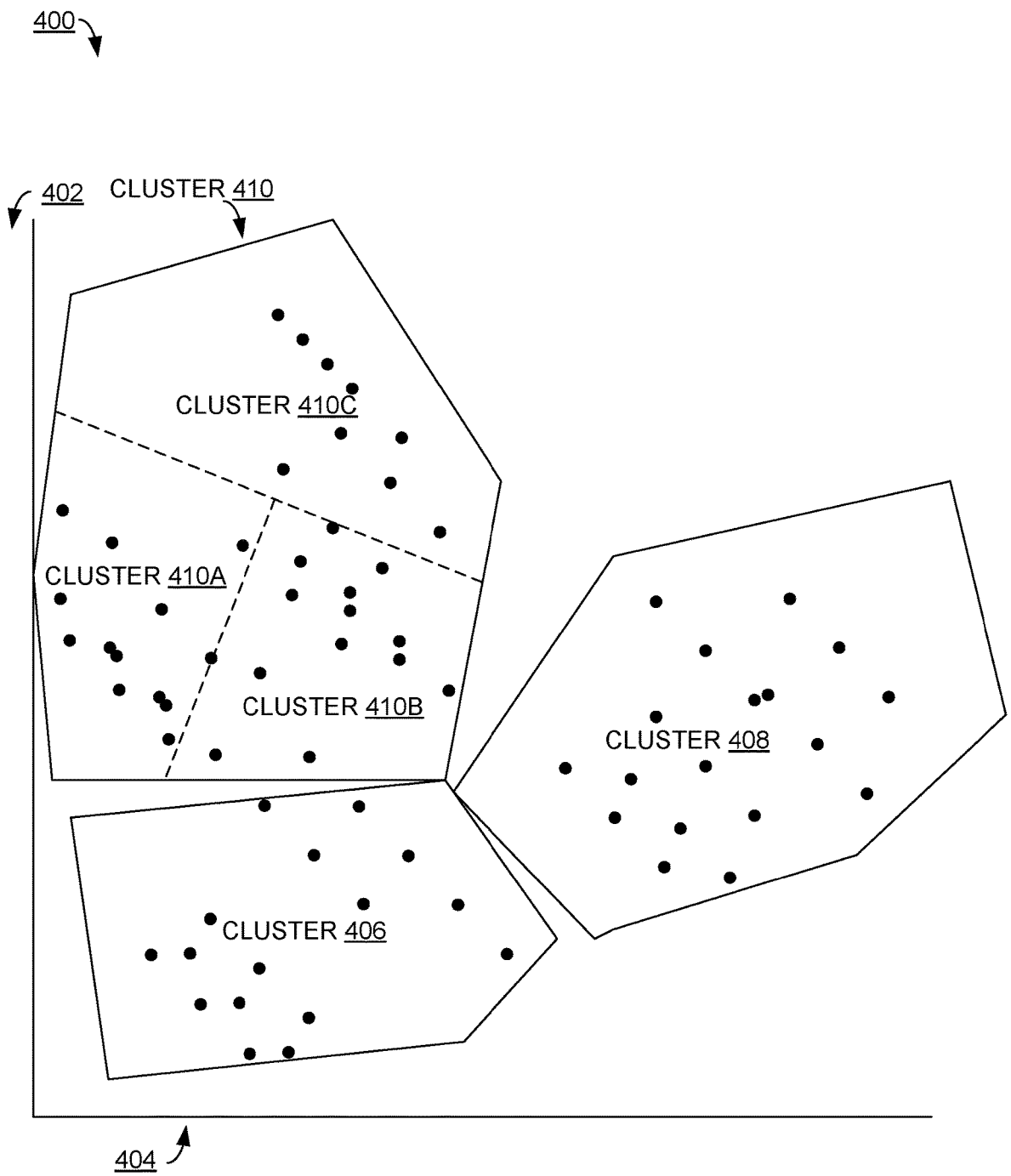
FIG. 4 illustrates an example cluster graph for clustering devices that can facilitate collector conflict resolution, in accordance with an embodiment of this disclosure.

FIG. 4 illustrates an example cluster graph 400 for clustering devices that can facilitate collector conflict resolution, in accordance with an embodiment of this disclosure. In some examples, part(s) of cluster graph 400 can be used to implement part(s) of 208 and 210 of process flow 200 of FIG. 2.

Cluster graph 400 plots different systems in different clusters based on metrics of texture mean 402 and radius mean 404. Cluster graph 400 comprises cluster 406 (which corresponds to one collector), cluster 408 (which corresponds to another collector), and clusters 410A, 410B, and 410C (which each correspond to a third collector).

Where a system is assigned to a cluster, that can indicate that a collector that corresponds to that cluster will be used for receiving monitoring data for that system (and other data for that system from other collectors will be disregarded).

Using the example of clusters 410$a$ (C1), 410$b$ (C2), and 410$c$ (C3), where there are already clusters of devices for one collector (COL1), the following can be implemented.

A similarity score can be determined for each cluster. Where the similarity score is above a predetermined threshold value (e.g., the similarity for S1 to one of the clusters meets a threshold level of similarity), and C2 has the highest determined similarity score, then S1 can be assigned to COL1→C2.

If the similarity scores are below the predetermined threshold value for all clusters, then an outlier can be formed, as described with respect to cluster graph 500 of FIG. 5, below.

Similarity scores can be determined based on attributes of systems, and a similarity score can be determined between a candidate system and a cluster (which can comprise multiple systems). An attribute can be location, and can have sub-attributes, such as data center, room with the data center, aisle within the room, rack within the aisle, and slot within the rack. In some examples, each of these sub-attributes can be assigned a value, where the values can sum to 1.

For example, the data center can have a value of 0.5, the room a value of 0.3, the aisle a value of 0.1, the rack a value of 0.07, and the slot a value of 0.03. Where there is a match between the sub-attribute of the candidate system and the cluster, the corresponding value can be assigned for the similarity value. That is, where the system and the cluster match on rack, room, and aisle (but not rack or slot), the value for the attribute of location can be 0.9 (0.5 for rack+0.3 for room+0.1 for aisle).

There can be other attributes used in determining a similarity value than location, such as network attributes.

A similarity score between two devices can be determined as follows. For each component type, determine a similarity score. In some examples, a perceptron can be used. For the component types, and where SS is the similarity score, the following can be determined: $P1_{w1}*SS_{(P1)}+P2_{w2}*SS_{(P2)}+P3_{w3}*SS_{(P3)}$ The score can be weighed based on the following categories, in this example:

1. P1: Customer environment (e.g., location, network attributes)
2. P2: Hardware attributes (e.g., central processing unit (CPU), memory, graphics processing unit (GPU), drives)
3. P3: Other attributes (e.g., operating system (OS), device capabilities)

These determinations can be made based on a mean value of the cluster.

The similarity threshold (e.g., minimum similarity for assignment) can be determined as follows. A perceptron can be used for chained values, such as in the following example:

1. Similarity Score (SS) is normalized and can range from 0-1.
2. $P1_{w1}+P2_{w2}+P3_{w3}=1$ (That is, the sum of all priorities can be 1). E.g., P1=0.5, P2=0.3, P3=0.2.
3. In this example, the maximum similarity can be 1 if all attributes do match.
4. In this example, the score is less than one where there is a partial match (e.g., the score is 0.5 if P1 completely matches, and P2 and P3 do not match at all).
5. The minimum threshold can then be (P1+P3)*0.1=0.07 for assignment. This scalar value (0.1) and the weights (e.g., 0.5 if P1 completely matches) can be determined experimentally, based on a number of systems that are applied to a cluster when different values are used. It can be that there are a target number of systems for each cluster, and the number of systems actually assigned to each cluster can be fine-tuned by altering these values.

In other examples, system S2 belongs to collector 2 (COL2), but COL1 starts to send data for S1. In this case:
1. If (Similarity (S1, COL1)>Similarity (S1, COL2)) or COL2 not active
   a. If both are in the same company, then the flip can be allowed
   b. If COL2 is not active anymore, then the flip can be allowed. In this case, new clusters can be formed or updated.
      i. Data can also be deleted for S1 before performing the flip.
   c. Checks to be performed before the flip can include:
      i. Tenant check (if tenants are the same then do the switch based on an activated collector). There can also be a company check, where one company can potentially have multiple tenants. A company can be a superset of tenants, and this check can be based on what users are using what systems. A check of this sort can be, "A migration is allowed if a particular user owns the system." In some examples, a user can have multiple tenants. In some examples, multiple entities (e.g., companies) can share tenants.
      ii. Appropriate messages can be sent over for notifications.
2. Otherwise S1 can remain assigned to COL2
3. For the case when the system is moved from company1 to another company2, all data for S1 can be deleted before the transfer.

In some examples, a collector state can be primary; duplicate same company backup; duplicate difference company; and/or deleted.

In some examples, special clustering, and/or spectral clustering techniques can be implemented to facilitate the present techniques.

Figure 5:
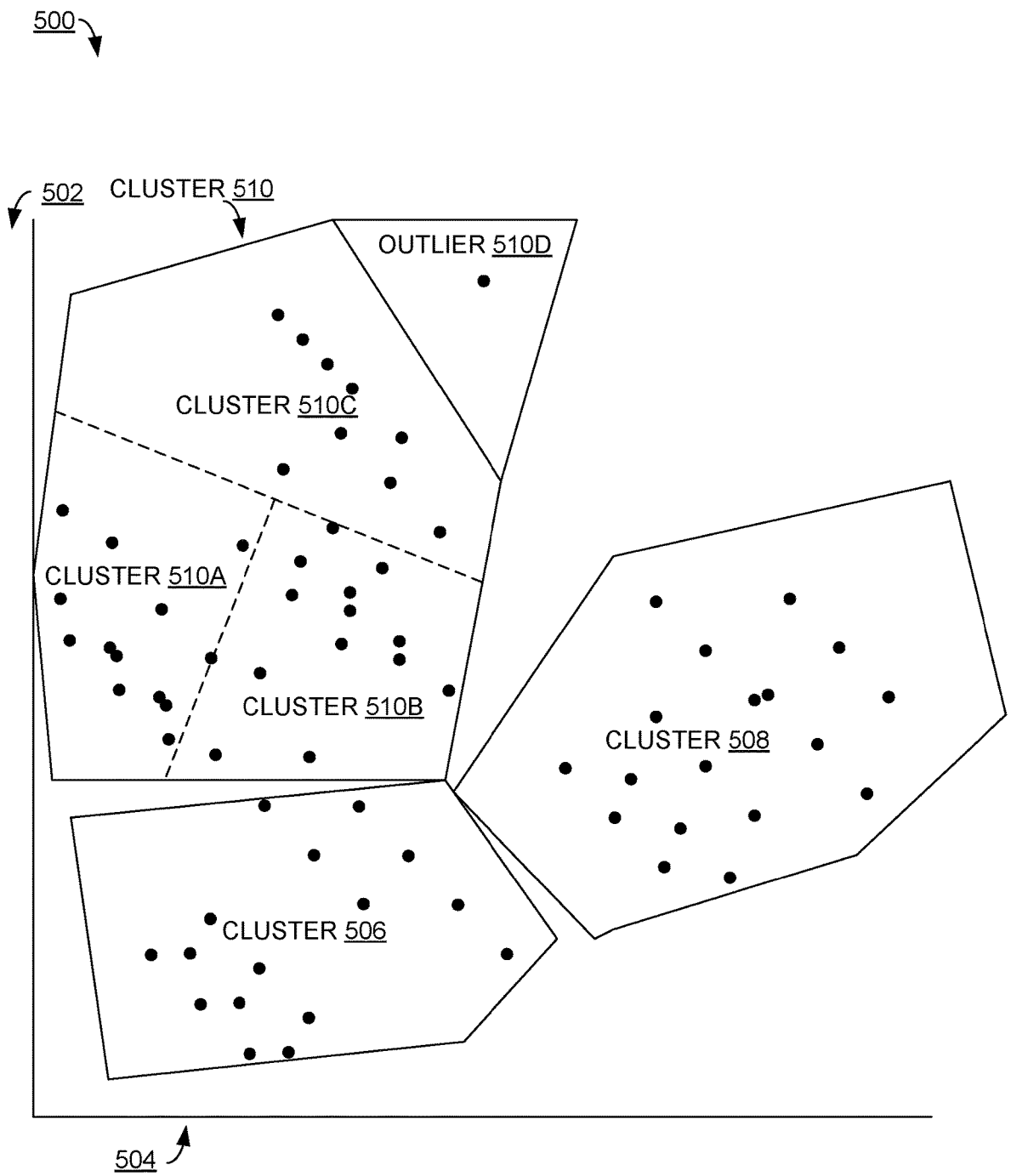
FIG. 5 illustrates an example cluster graph for handling a clustering outlier that can facilitate collector conflict resolution, in accordance with an embodiment of this disclosure.

FIG. 5 illustrates an example cluster graph 500 for handling a clustering outlier that can facilitate collector conflict resolution, in accordance with an embodiment of this disclosure. In some examples, part(s) of cluster graph 500 can be used to implement part(s) of 212 of process flow 200 of FIG. 2.

Cluster graph 500 can be similar to cluster graph 400 with the addition of an outlier (410d).

Cluster graph 500 plots different systems in different clusters based on metrics of texture mean 502 and radius mean 504. Cluster graph 500 comprises cluster 506 (which corresponds to one collector), cluster 508 (which corresponds to another collector), and clusters 510a, 510b, and 510c (which each correspond to a third collector), and outlier 510d (which also corresponds to the third collector, and can sometimes be referred to as an outlier cluster).

In some examples, an outlier first involves one outlier system. As more neighboring outliers are identified, there can be a threshold number of individual outliers that can then be considered an outlier cluster (e.g., five outliers makes an outlier cluster). As more systems are added to an outlier cluster, an outlier cluster can be considered a "normal" cluster (e.g., once an outlier cluster has 20 systems, it is then considered to be a normal cluster). As used herein, "cluster" can sometimes be used to refer to outliers, outlier clusters, and normal clusters.

Cluster graph 500 can relate to formation of outliers, and handling those outliers.

In an example where a system is completely different from the clusters, the system can be marked as an outlier. An outlier can comprise a cluster of one, or a few, systems.

In this case, it can be that a similarity score for (COL1, S1) is the highest, but it is still below the threshold value. Therefore, S1 can be associated with COL1 but remain in a separate cluster.

In this example, it can be that a score of (CLU1, S1) is greater than that of (COL3, S1) (where COL3 is collector 3), but that score is still lower than the threshold.

In some examples, a system that is considered to be an outlier can be easily migrated. That is, where another collector enters with a higher similarity score between the system and clusters of the new collector, the system can migrate to the new collector (where the customer is the same). In some examples, migration does not occur where the customers are different.

In some examples, server migration to a different customer occurs in a case where C1's collector becomes inactive. But, where the outlier cluster grows, then it can be that the cluster is no longer an outlier cluster.

In an example where more systems are assigned (for example, once a threshold of systems is crossed, a new cluster can be formed, and the system is no longer classified as an outlier).

Figure 6:
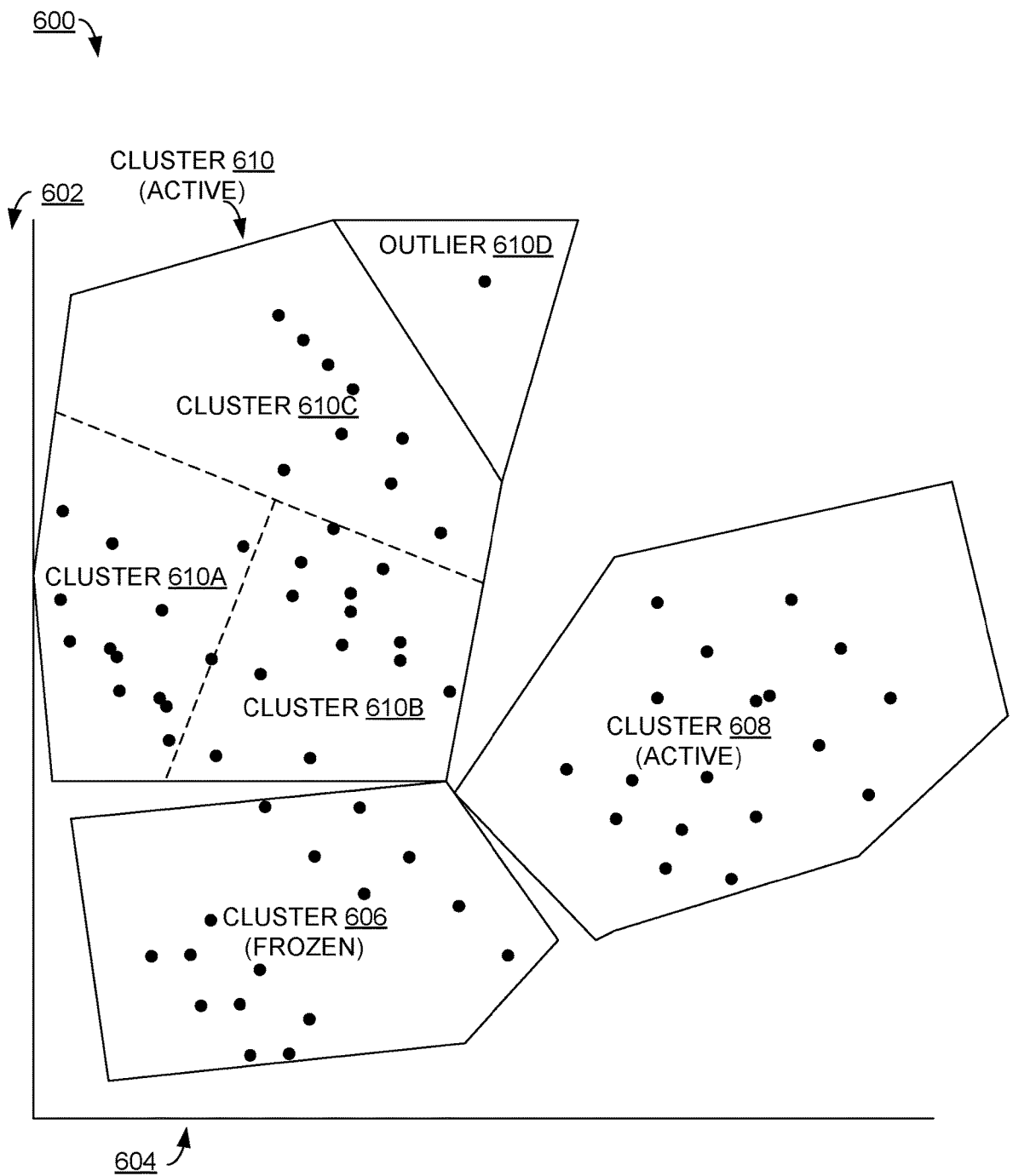
FIG. 6 illustrates an example cluster graph for modifying clusters that can facilitate collector conflict resolution, in accordance with an embodiment of this disclosure.

FIG. 6 illustrates an example cluster graph 600 for modifying clusters that can facilitate collector conflict resolution, in accordance with an embodiment of this disclosure. In some examples, part(s) of cluster graph 600 can be used to implement part(s) of 214 of process flow 200 of FIG. 2.

Cluster graph 500 plots different systems in different clusters based on metrics of texture mean 502 and radius mean 504. Cluster graph 500 comprises cluster 506 (which corresponds to one collector), cluster 508 (which corresponds to another collector), and cluster 510 (which corresponds to a third collector). As depicted, cluster 508 and cluster 510 are accepting new systems assigned to them (so, where a particular system has its metrics reported by a collector that corresponds to that cluster). And cluster 506 is frozen, so no systems will be assigned to it (so, no system will be added to have its metrics reported by a collector that corresponds to that cluster).

Cluster graph 600 can relate to customer guidance in refining, and/or constraining decisions.

In some examples, only an owner for a collector and system can set guidance. Guidance can be set in the form of rules such as:
1. A user can freeze an collector. In this example, an collector is not considered for similarity score determination.
2. A user can freeze the cluster. In this example, a cluster is not considered for similarity score determination.

3. A user can freeze a system. In this example, a system is assigned to a given cluster (so, data reported from the collector that corresponds to that cluster will be used).
4. A user can mark a system as having an ownership change. This ownership change can be over which collector owns monitoring data for a particular system.
5. A user can set a priority of acceptance. For example, in a scenario where there are multiple tenants for customers, CLU2 can have priority P1 (which is higher than a priority of CLU1), so bordering cases for CLU1 and CLU2 can fall more toward CLU2. In some examples, a priority can be a scalar value assigned to a similarity score to increase a similarity score for clusters with a higher priority, and decrease a similarity score for clusters with a lower priority. In some examples, the priority can be binary—0 or 1. This can be to migrate systems away from a particular collector (assigned a priority of 0) and to another collector (assigned a priority of 1). A reason for this can be to retire an old collector and replace it with a new collector. In another example, the priority can be used to distribute systems across multiple collectors (e.g., assign each collector the same priority so that collector assignment is made based on the similarity score without regard to differing priorities).

Example Graph

Figure 7:
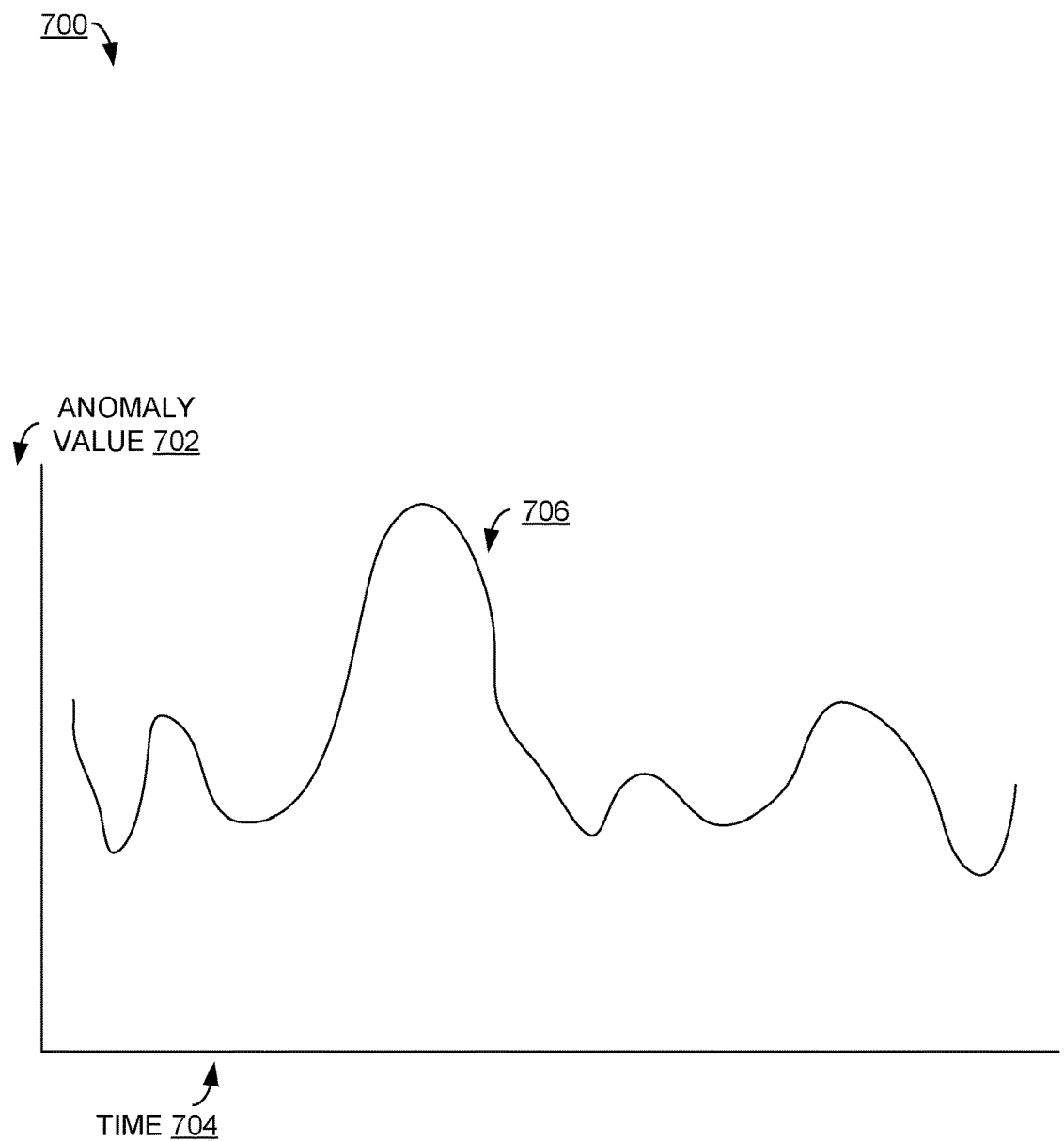
FIG. 7 illustrates an example anomaly graph that can facilitate collector conflict resolution, in accordance with an embodiment of this disclosure.

FIG. 7 illustrates an example anomaly graph 700 that can facilitate collector conflict resolution, in accordance with an embodiment of this disclosure. In some examples, part(s) of anomaly graph 700 can be used to implement part(s) of collector conflict resolution component 108 of FIG. 1.

Anomaly graph 700 plots anomaly value 702 against time 704, with plot 706. Where a large anomaly value is identified in plot 706, this can be alerted to an administrator.

Anomaly value 702 can measure how many systems are assigned to the cluster in question. It can be that, when a particularly high or low number of systems are assigned to a particular cluster, this can be considered to indicative of improper performance of the present techniques, and so that situation can be considered anomalous.

Anomaly graph 700 can be used to consider anomaly graphs or data representation graphs of:
Incoming new systems and how the ecosystem for customers is changing (e.g., growing).
Removal of systems. It can be that a drastic drop in the number of systems is a security risk.
Migration of systems, for the case when systems do migrate from one collector to another.
Monitoring cluster size mean and standard deviation.

This information can provide insights into how similar the systems are, and can also provide guidance for customers to configure attributes, or make a group of systems.

These anomaly graphs can be interactive, and customers can be able to take actions to effectuate the guidance discussed above.

Example Process Flows

FIG. 8 illustrates an example process flow 800 that can facilitate collector conflict resolution, in accordance with an embodiment of this disclosure. In some examples, one or more embodiments of process flow 800 can be implemented by collector conflict resolution component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 900 of FIG. 9, and/or process flow 1000 of FIG. 10.

Process flow 800 begins with 802, and moves to operation 804.

Operation 804 depicts, in response to receiving first monitoring data for a first computing system from a first collector, associating the first computing system with a first cluster of a group of clusters that corresponds to the first collector. That is, collector conflict resolution component 108 of FIG. 1 can receive monitoring data from a collector of collectors 106 that regards a system of monitored systems 110. This system can be associated with a cluster. In some examples, this can be an existing cluster, a new cluster, or an outlier cluster.

In some examples, operation 804 comprises, in response to determining that no cluster exists, creating the first cluster. That is, where there are no existing clusters, a new cluster can be created for the monitored system.

In some examples, operation 804 comprises in response to determining that respective similarity values between the first computing system and respective clusters of the group of clusters are below a predetermined threshold value, associating the first computing system with the first cluster, wherein the first cluster comprises an outlier to another cluster of the group of clusters other than the first cluster. That is, a monitored system can be marked as an outlier.

In some examples, the first collector corresponds to the first cluster, and the first collector corresponds to a third cluster of the group of clusters. That is, one collector can be associated with multiple different clusters.

In some examples, each cluster of the group of clusters is associated with one collector. That is, it can be that for each cluster, that cluster is associated with only one collector.

After operation 804, process flow 800 moves to operation 806.

Operation 806 depicts, in response to receiving second monitoring data for the first computing system from a second collector, and in response to determining that a first similarity value between the first computing system and the first collector is less than a second similarity value between the first computing system and the second collector, changing an association of the first computing system from the first cluster to a second cluster of the group of clusters that corresponds to the second collector. That is, collector conflict resolution component 108 can receive monitoring data from a second collector of collectors 106 (a different collector than in operation 804) that regards the system of monitored systems 110 (the same system of monitored systems 110). In its clustering, collector conflict resolution component 108 can determine to flip the system from being associated with its current cluster (that is associated with the first collector) to a new cluster (that is associated with the second collector).

After operation 806, process flow 800 moves to operation 808.

Operation 808 depicts, in response to changing the association of the first computing system from the first cluster to the second cluster, storing third monitoring data for the first computing system that is received from the second collector and disregarding fourth monitoring data for the first computing system that is received from the first collector. That is, as a result of flipping the monitored system from a cluster for the first collector to a cluster for the second collector, monitoring data for the monitored system received from the second collector can be stored, and monitoring data for the monitored system received from the first collector can be discarded.

In some examples, operation 808 comprises, in response to receiving fifth monitoring data for the first computing system from a third collector, and in response to determining that a third similarity value between the first computing system and the third collector is less than the second similarity value, determining to maintain the association of the first computing system with the second cluster, and disregarding sixth monitoring data for the first computing system that is received from the third collector. That is, in a scenario where monitoring data for a monitored system is received from multiple collectors, it can be determined to keep the monitored system associated with its current collector and not flip the association of the monitored system to a different collector.

In some examples, operation 808 comprises, in response to receiving fifth monitoring data for the first computing system from a third collector, and in response to determining that the second collector is inactive, changing the association of the first computing system from the second cluster to a third cluster of the group of clusters that corresponds to the third collector. That is, a monitored system can be flipped from being associated with one collector to being associated with another collector where the former collector is inactive.

In some examples, a collector can be determined to be inactive when monitoring data from that collector has not been received for at least a threshold amount of time (e.g., one hour).

After operation 808, process flow 800 moves to 810, where process flow 800 ends.

FIG. 9 illustrates an example process flow 900 that can facilitate collector conflict resolution, in accordance with an embodiment of this disclosure. In some examples, one or more embodiments of process flow 900 can be implemented by collector conflict resolution component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 800 of FIG. 8, and/or process flow 1000 of FIG. 10.

Process flow 900 begins with 902, and moves to operation 904.

Operation 904 depicts associating a first device with a first cluster of a group of clusters that corresponds to a first collecting device that provides monitoring data about the first device. In some examples, operation 904 can be implemented in a similar manner as operation 804 of FIG. 8.

After operation 904, process flow 900 moves to operation 906.

Operation 906 depicts, in response to receiving second monitoring data for the first device from a second collecting device, and in response to determining that a first similarity value between the first device and the first collecting device is less than a second similarity value between the first device and the second collecting device, changing an association of the first device from the first cluster to a second cluster of the group of clusters that corresponds to the second collecting device. In some examples, operation 906 can be implemented in a similar manner as operation 806 of FIG. 8.

In some examples, operation 906 comprises determining to omit a third collecting device from similarity value determinations. That is, a collector can be frozen at collector conflict resolution component 108 of FIG. 1 for a purpose of assigning monitored systems to clusters. Where a collector is frozen, it can be that it is not considered in making similarity score determinations.

In some examples, operation 906 comprises determining to omit a third cluster of the group of clusters from similarity value determinations. That is, a cluster can be frozen at collector conflict resolution component 108 of FIG. 1 for a purpose of assigning monitored systems to clusters. Where a cluster is frozen, it can be that it is not considered in making similarity score determinations.

In some examples, operation 906 comprises determining to maintain the association of the first device with the second cluster regardless of similarity score determinations. That is, a monitored system can be frozen such that its association with a collector is not changed by collector conflict resolution component 108 of FIG. 1.

In some examples, operation 906 comprises changing the association of the first device from the second cluster to a third cluster of the group of clusters that corresponds to a third collecting device in response to receiving user input data indicative of changing device ownership. That is, user input can be received that indicates to associate a monitored system with a particular collector (and/or cluster).

In some examples, the first similarity value comprises a measurement of physical environments of devices, or of hardware attributes of devices. That is, metrics of a customer environment can be evaluated in determining a similarity score, such as physical location and/or customer network attributes.

In some examples, the first similarity value comprises a combination of respective weightings of respective characteristics of respective devices. That is, metrics of monitored system attributes can be evaluated in determining a similarity score, such as metrics relating to computing processors, memory, graphics processors, and drives.

In some examples, the first similarity value is determined with a perceptron. A perceptron can generally comprise a machine learning system for supervised learning of binary classifiers.

After operation 906, process flow 900 moves to operation 908.

Operation 908 depicts, in response to changing the association of the first device from the first cluster to the second cluster, storing third monitoring data for the first device that is received from the second collecting device and disregarding fourth monitoring data for the first device that is received from the first collecting device. In some examples, operation 908 can be implemented in a similar manner as operation 808 of FIG. 8.

After operation 908, process flow 900 moves to 910, where process flow 900 ends.

FIG. 10 illustrates an example process flow 1000 that can facilitate collector conflict resolution. In some examples, one or more embodiments of process flow 1000 can be implemented by collector conflict resolution component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 800 of FIG. 8, and/or process flow 900 of FIG. 9.

Process flow 1000 begins with 1002, and moves to operation 1004.

Operation 1004 depicts associating a first computing device with a first cluster of a group of clusters that corresponds to a first collecting device that provides monitoring data about the first computing device. In some examples, operation 1004 can be implemented in a similar manner as operation 804 of FIG. 8.

In some examples, operation 1004 comprises forming the first cluster based on a density-based spatial clustering process or a spectral clustering process. That is, these techniques can be implemented in performing clustering on monitored systems to form clusters by collector conflict resolution component 108 of FIG. 1.

In some examples, operation 1004 comprises using a defined priority of acceptance of clusters of the group of clusters for assigning computing devices to clusters. That is, users can provide user input data that indicates a priority of acceptance. For example, one cluster can have a higher priority for having a monitored system assigned to it than another. This priority can be implemented as a scalar in a similarity value determination, where the scalar can increase the similarity value for a given cluster that is marked as high priority.

After operation 1004, process flow 1000 moves to operation 1006.

Operation 1006 depicts, in response to receiving second monitoring data for the first computing device from a second collecting device, and in response to determining that a first similarity value between the first computing device and the first collecting device is less than a second similarity value between the first computing device and the second collecting device, changing an association of the first computing device from the first cluster to a second cluster of the group of clusters that corresponds to the second collecting device. In some examples, operation 1006 can be implemented in a similar manner as operation 806 of FIG. 8.

In some examples, operation 1006 comprises determining that a first tenant that corresponds to the first computing device matches a second tenant that corresponds to the second cluster. In some examples, operation 1006 comprises determining that a first owner that corresponds to the first computing device matches a second owner that corresponds to the second cluster. That is, checks can be performed before flipping the association of a monitored system from one cluster (and its corresponding collector) to another. One check can be a tenant check (e.g., if tenants are the same then do a switch based on an activated collector). Another check can be a company check, such as in a scenario where one company has multiple tenants.

After operation 1006, process flow 1000 moves to operation 1008.

Operation 1008 depicts, in response to changing the association of the first computing device from the first cluster to the second cluster, storing third monitoring data for the first computing device that is received from the second collecting device. In some examples, operation 1008 can be implemented in a similar manner as operation 808 of FIG. 8.

After operation 1008, process flow 1000 moves to 1010, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of monitoring server 102, collectors 106, and/or monitored systems 110 of FIG. 1.

In some examples, computing environment 1100 can implement one or more embodiments of the process flows of FIGS. 8-10 to facilitate collector conflict resolution.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Conclusion

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory coupled to the processor, comprising instructions that cause the processor to perform operations comprising:
   in response to receiving first monitoring data for a first computing system from a first collector, associating the first computing system with a first cluster of a group of clusters that corresponds to the first collector, wherein the associating indicates that first monitoring data, for the first computing system that is received from the first collector, is recognized as valid, and that second monitoring data, for the first computing system that is received from a collector other than the first collector, is not recognized as valid;
   in response to receiving the second monitoring data for the first computing system from a second collector, and in response to determining that a first similarity value between the first computing system and first computing systems of the first collector is less than a second similarity value between the first computing system and second computing systems of the second collector, changing an association of the first computing system from the first cluster to a second cluster of the group of clusters that corresponds to the second collector, wherein the first collector is recognized as the valid source of third monitoring data of the first computer systems, and wherein the second collector is recognized as the valid source of fourth monitoring data of the second computer systems; and
   in response to changing the association of the first computing system from the first cluster to the second cluster, storing fifth monitoring data for the first computing system that is received from the second collector and disregarding sixth monitoring data for the first computing system that is received from the first collector.

2. The system of claim 1, wherein the operations further comprise:
   in response to receiving fifth monitoring data for the first computing system from a third collector, and in response to determining that a third similarity value between the first computing system and the third collector is less than the second similarity value,
   determining to maintain the association of the first computing system with the second cluster; and
   disregarding sixth monitoring data for the first computing system that is received from the third collector.

3. The system of claim 1, wherein associating the first computing system with the first cluster comprises:
   in response to determining that no cluster exists, creating the first cluster.

4. The system of claim 1, wherein associating the first computing system with the first cluster comprises:
   in response to determining that respective similarity values between the first computing system and respective clusters of the group of clusters are below a predetermined threshold value, associating the first computing system with the first cluster, wherein the first cluster comprises an outlier to another cluster of the group of clusters other than the first cluster.

5. The system of claim 1, wherein the operations further comprise:
in response to receiving fifth monitoring data for the first computing system from a third collector, and in response to determining that the second collector is inactive, changing the association of the first computing system from the second cluster to a third cluster of the group of clusters that corresponds to the third collector.

6. The system of claim 1, wherein the first collector corresponds to the first cluster, and wherein the first collector corresponds to a third cluster of the group of clusters.

7. The system of claim 1, wherein each cluster of the group of clusters is associated with one collector.

8. The system of claim 1, wherein the first similarity value between the first computing system and first computing systems of the first collector is based on at least one of respective computing processors of the first computing system and first computing systems, respective memories of the first computing system and first computing systems, respective graphics processors of the first computing system and first computing systems, or respective drives of the first computing system and first computing systems.

9. A method, comprising:
associating, by a system comprising a processor, a first device with a first cluster of a group of clusters that corresponds to a first collecting device that provides monitoring data about the first device, wherein the associating indicates that first monitoring data, for the first device that is received from the first collecting device, is recognized as valid, and that second monitoring data, for the first device system that is received from a collecting device other than the first collecting device, is recognized as invalid;
in response to receiving the second monitoring data for the first device from a second collecting device, and in response to determining that a first similarity value between the first device and first devices of the first collecting device is less than a second similarity value between the first device and second devices of the second collecting device, changing, by the system, an association of the first device from the first cluster to a second cluster of the group of clusters that corresponds to the second collecting device, wherein the first collecting device is recognized as the valid source of third monitoring data of the first devices, and wherein the second collecting device is recognized as the valid source of fourth monitoring data of the second devices; and
in response to changing the association of the first device from the first cluster to the second cluster, storing, by the system, fifth monitoring data for the first device that is received from the second collecting device and disregarding sixth monitoring data for the first device that is received from the first collecting device.

10. The method of claim 9, further comprising:
determining, by the system, to omit a third collecting device from similarity value determinations.

11. The method of claim 9, further comprising:
determining, by the system, to omit a third cluster of the group of clusters from similarity value determinations.

12. The method of claim 9, further comprising:
determining, by the system, to maintain the association of the first device with the second cluster regardless of similarity score determinations.

13. The method of claim 9, further comprising:
changing, by the system, the association of the first device from the second cluster to a third cluster of the group of clusters that corresponds to a third collecting device in response to receiving user input data indicative of changing device ownership.

14. The method of claim 9, wherein the first similarity value comprises a measurement of physical environments of devices, or of hardware attributes of devices.

15. The method of claim 9, wherein the first similarity value comprises a combination of respective weightings of respective characteristics of respective devices.

16. The method of claim 9, wherein the first similarity value is determined with a perceptron.

17. A non-transitory computer-readable medium comprising instructions that, in response to execution, cause a system comprising a processor to perform operations, comprising:
associating a first computing device with a first cluster of a group of clusters that corresponds to a first collecting device that provides monitoring data about the first computing device, wherein the associating indicates that first monitoring data, for the first computing device that is received from the first collecting device, is recognized as valid, and that second monitoring data, for the first computing system that is received from a collector other than the first collector, is not recognized as valid;
in response to receiving second monitoring data for the first computing device from a second collecting device, and in response to determining that a first similarity value between the first computing device and first devices of the first collecting device is less than a second similarity value between the first computing device and second devices of the second collecting device, changing an association of the first computing device from the first cluster to a second cluster of the group of clusters that corresponds to the second collecting device, wherein the first collecting device is recognized as the valid source of third monitoring data of the first computing devices, and wherein the second collecting device is recognized as the valid source of fourth monitoring data of the second computing devices; and
in response to changing the association of the first computing device from the first cluster to the second cluster, storing fourth monitoring data for the first computing device that is received from the second collecting device.

18. The non-transitory computer-readable medium of claim 17, wherein the operations further comprise:
forming the first cluster based on a density-based spatial clustering process or a spectral clustering process.

19. The non-transitory computer-readable medium of claim 17, wherein the operations further comprise:
using a defined priority of acceptance of clusters of the group of clusters for assigning computing devices to clusters.

20. The non-transitory computer-readable medium of claim 17, wherein changing the association of the first computing device from the first cluster to the second cluster comprises:
determining that a first tenant or a first owner that corresponds to the first computing device matches a second tenant or a second owner that corresponds to the second cluster.

* * * * *